United States Patent [19]

Viskochil

[11] Patent Number: 5,650,896
[45] Date of Patent: Jul. 22, 1997

[54] LOW COST PLASTIC OVERMOLDED ROTARY VOICE COIL ACTUATOR

[75] Inventor: Stephen Viskochil, Los Gatos, Calif.

[73] Assignee: Quantum Corporation, Milpitas, Calif.

[21] Appl. No.: 442,594

[22] Filed: May 17, 1995

[51] Int. Cl.$^6$ .............. G11B 5/55; G11B 21/08; G11B 5/48; G11B 21/16
[52] U.S. Cl. .............. 360/106; 360/105; 360/104
[58] Field of Search .................. 360/106, 105, 360/109, 107, 104; 324/207.21

[56] References Cited

U.S. PATENT DOCUMENTS

| | | | |
|---|---|---|---|
| 4,150,407 | 4/1979 | Dijkstra | 360/106 |
| 5,122,703 | 6/1992 | Takahashi et al. | 310/36 |
| 5,148,071 | 9/1992 | Takahashi | 310/208 |
| 5,161,077 | 11/1992 | Jabbari | 360/106 |
| 5,165,090 | 11/1992 | Takahashi et al. | 369/215 |
| 5,168,184 | 12/1992 | Umehara et al. | 301/13 |
| 5,168,185 | 12/1992 | Umehara et al. | 310/15 |
| 5,184,265 | 2/1993 | Foote et al. | 360/106 |
| 5,227,936 | 7/1993 | Strickler et al. | 360/106 |
| 5,251,085 | 10/1993 | Morris et al. | 360/106 |
| 5,283,704 | 2/1994 | Reidenbach | 360/104 |
| 5,305,169 | 4/1994 | Andreson et al. | 360/106 |
| 5,382,851 | 1/1995 | Loubier | 310/13 |
| 5,488,294 | 1/1996 | Liddell et al. | 324/207.21 |
| 5,532,889 | 7/1996 | Stefansky et al. | 360/104 |

*Primary Examiner*—John H. Wolff
*Assistant Examiner*—Adriana Giordana
*Attorney, Agent, or Firm*—David B. Harrison; Debra A. Chun

[57] ABSTRACT

A voice coil rotor is formed with a metal hub alignment insert for interiorly receiving an assembly of bearings and for exteriorly receiving and retaining at least two head arms against radial walls of an integral annular spacer ring portion. An overmolded plastic hub encapsulates at least one leg of a generally trapezoidal voice coil as well as the exterior of the metal hub alignment insert and adjacent portions of the head arms attached thereto.

12 Claims, 3 Drawing Sheets

LOW COST PLASTIC OVERMOLDED ROTARY VOICE COIL ACTUATOR

SUMMARY OF THE INVENTION

The present invention relates to a method for forming a low cost rotary voice coil actuator for e.g. a hard disk drive. More particularly, the present invention relates to an overmolded rotary voice coil actuator employing low cost sheet metal head arms and an alignment hub.

BACKGROUND OF THE INVENTION

Consonant with a trend toward small form factor hard disk drives, linear voice coil actuator structures have become supplanted with rotary or swing arm voice coil actuators. Such actuators are used to position a stack of heads relative to circular data tracks formed on a stack of rotating disks. Conventionally, rotary actuators have included a cast aluminum alloy E-shaped block forming a bearing hub and a voice coil. The voice coil has been attached to the hub in some instances with an adhesive, and in other instances with overmolding of a plastic material. A head-gimbal assembly including a load beam carrying a gimbal and slider-transducer ("head") has been attached to an outer end of the E block. The load beam provides a preload force to the head to urge it against an adjacent disk data storage surface. As the disk rotates, the head overcomes the preload force and "flies" several microinches above the disk surface on an air cushion or bearing, in accordance with what has come to be known in the art as Winchester technology. The voice coil was positioned in a gap having an intense magnetic force field provided by one or more permanent magnets. Current passing through the voice coil caused the actuator rotor to rotate in one direction or the other, depending upon direction of current flow, in accordance with Maxwell's fight hand rule.

One of the drawbacks of the conventional die cast E-block was the cost incurred in die casting and precision machining the irregularly shaped E block to reach its required size tolerances. Another one of the drawbacks of the die cast E-block was its mass moment and relative high inertia. This high level of inertia has required more and more powerful voice coil motors, which have been achieved at greater cost by employing rare earth magnets, such as neodymium-iron-boron alloy permanent magnets for example. Another drawback with die cast E-blocks was transmission of unwanted acoustic noise energy to the drive housing due to inherently low internal damping of the die cast metallic structure There are also drawbacks associated with all-plastic actuator hubs. One drawback of one published approach, found in U.S. Pat. No. 5,382,851 for "Swing-Type Actuator", is that the sheet metal head arms embedded in the molded plastic hub are not in direct, low-Ohmic electrical contact with the bearing assembly and the disk drive base. Failure to ground the head arms may give rise to electrostatic discharge and resultant damage to preamplifier ICs, thin film head structures, and particularly magneto-resistive read-transducers which are now coming into more widespread usage in hard disk drive technology.

While all-plastic E blocks have been variously proposed over the years and are present in the prior art, they have met with very little success or acceptance. Head attachment issues, thermal stability issues, electrical grounding issues, moving single-turn conductive plastic overmold, and vertical stiffness issues have remained substantially unsolved. Also, the inherent anisotropic properties of plastics, their tendency to creep or cold-flow over time and temperature gradients, and the shrinkage inherent to the plastic molding process have contributed to warpage, changes in coplanarity between the head stack and the rotating disks, and misalignment of the actuator support bearings.

Thus, a hitherto unsolved need has remained for a low cost plastic overmolded rotary voice coil actuator rotor which overcomes limitations and drawbacks of the prior art.

SUMMARY OF THE INVENTION WITH OBJECTS

A general object of the present invention is to provide a new method for forming a rotary voice coil actuator rotor in a manner overcoming limitations and drawbacks of prior approaches.

Another more specific object of the present invention is to provide a rotary voice coil actuator rotor which achieves a significant cost reduction over previous die-cast aluminum, machined rotors.

A further object of the present invention is to provide a rotary voice coil actuator rotor which achieves significant weight reduction and lower moment of inertia achieving faster average track access times or lowered cost by enabling use of less expensive permanent magnets for performance equivalent to prior actuator structures and voice coil motors, or lower power consumption through achieving equivalent average track access times with a smaller electric current to the voice coil motor.

One more object of the present invention is to provide a rotary voice coil actuator rotor which manifests improved damping characteristics and results in reduced acoustic noise generation during use.

Yet another object of the present invention is to employ a metal hub alignment insert to provide and facilitate precision registration and interconnection of stamped sheet metal head arm components during formation and assembly processes of a rotary voice coil actuator structure in a manner overcoming prior art formation methods.

Yet one more object of the present invention is to employ a metal hub insert with precision-machined bearing faces and bearing seats, which maintain the concentricity and parallelism of the actuator support bearings more precisely than practical with molded plastic bearing bores and seats.

A still further object of the present invention is to employ a metal hub alignment insert during injection molding of a rotary voice coil actuator rotor in order to provide precision alignment of stamped sheet metal arms relative to an axis of rotation of the completed rotor relative to rotating disks within a hard disk drive into which the rotor will be installed.

Yet a still further object of the present invention is to provide a low Ohmic electrical connection between sheet metal head arms and metal hub alignment insert in a manner reducing potential for electrostatic discharge and resultant damage to sensitive electrical components including head preamplifier circuits and head transducer assemblies, particularly magnetoresistive read transducers.

One more object of the present invention is to provide a rotary voice coil actuator rotor comprising inexpensive stamped sheet metal head arms and a metal hub alignment insert overmolded by injection molded plastic in order to achieve improved head gimbal assembly attachment, thermal stability, electrical grounding, bearing alignment, and vertical alignment and stiffness over all-plastic actuator designs.

In accordance with one aspect of the invention, a formation method for forming a rotary voice coil actuator rotor for a hard disk drive comprises the following steps:

forming a metal hub alignment insert defining a central opening for receiving bearings and defining an outer wall including an integral annular spacer ring portion at a predetermined location along a longitudinal axis, the ring portion having an axial length of predetermined length for separating two head arms, forming at least two elongated head arms of sheet metal, each head arm including an outer end for attachment of a head gimbal assembly, and an inner end defining an opening for registering with the bearing hub, radially and axially aligning the elongated head arms along the longitudinal axis, placing the elongated head arms onto the bearing hub until each rests against a radial wall of the spacer ring, to form an actuator subassembly forming a generally flat, trapezoidally-shaped actuator voice coil of insulated wire, and providing end connectors for electrical connections to ends of the voice coil, positioning the actuator subassembly and the actuator voice coil and end connectors into an injection mold, and closing the mold, injecting liquid-phase plastic material into the injection mold to encapsulate the bearing hub and adjacent portions of the elongated head arms and voice coil, and encapsulating support portions of the connectors, to form an encapsulation assembly, after the plastic material has solidified, removing the encapsulation assembly from the mold, attaching head gimbal assemblies to the outer ends of the elongated head arms, and installing the bearings within the central bore of the bearing hub to complete the rotary voice coil actuator rotor.

In another aspect of the invention, a rotary voice coil actuator for a hard disk drive comprises: a generally trapezoidal voice coil of wire and two connector pins attached to ends thereof; a metal hub alignment insert defining a central opening for receiving an assembly of beatings and defining an outer wall including an integral annular spacer ring portion having a predetermined axial length for separating two head arms; at least two elongated head arms of sheet metal, each arm including an outer end and an inner end defining an opening for registering with the outer wall of the bearing hub, the head arms being attached to the metal hub in contact therewith and separated axially by the annular spacer ring portion; an overmolded plastic hub encapsulating at least one leg of the generally trapezoidal coil of wire and the connector pins, encapsulating the outer wall portion of the metal hub alignment insert and adjacent portions of the head arms attached thereto; a bearing assembly within the metal hub alignment insert and providing a low Ohmic contact between the head arms and a base, the bearing assembly including inner bearing races for contacting a post fixed to the base for supporting the rotary voice coil actuator; at least one head-gimbal assembly attached to each outer end of the elongated head arms; and, a permanent magnet stator structure affixed to the base adjacent to the voice coil.

In this other aspect of the invention, the rotary voice coil actuator includes three elongated head arms, wherein the at least two elongated head arms are separated by the annular spacer ring portion, and an additional spacer ring is positioned over the outer wall of the metal hub alignment insert to separate one of the at least two elongated head arms and a third elongated head arm.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
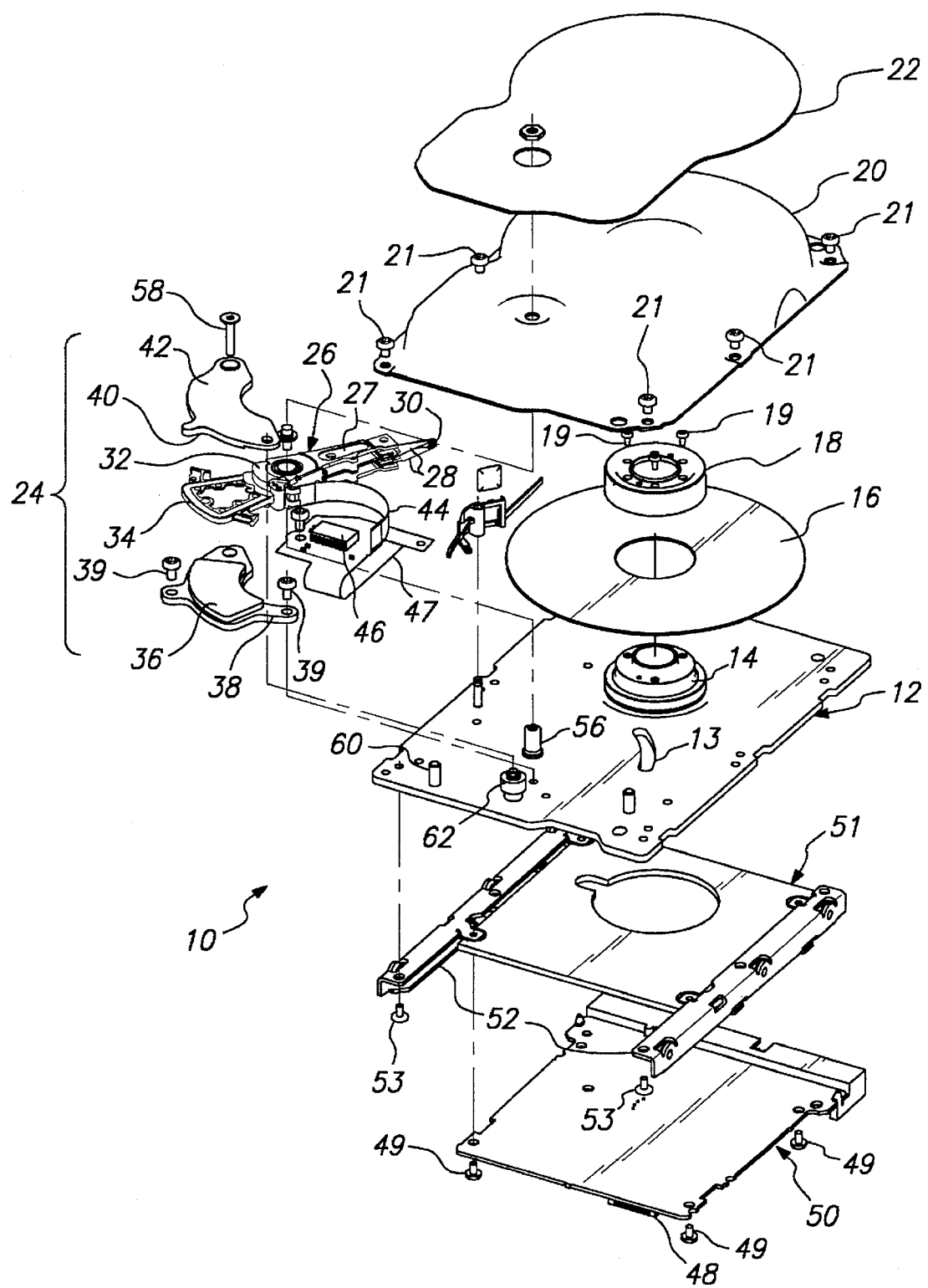
FIG. 1 is an exploded assembly drawing in isometric projection of a hard disk drive including a rotary actuator in accordance with principles of the present invention.

With reference to FIG. 1, a hard disk drive 10 includes a substantially flat base 12, a spindle motor-disk hub assembly 14, at least one data storage disk 16, a disk clamp 18 held by screws 19 to the hub assembly 14 for clamping the data storage disk in place, and a deep-drawn sheet metal cover 20, also held in place over the base 12 by screws 21. A gasket (not shown) is placed between the base and a peripheral flange of the sheet metal cover 20. A sound-deadening laminate plate 22 is preferably affixed over the cover 20 by a suitable adhesive to reduce audible sound energy otherwise emanating from the operating disk drive 10. A curved access slot 13 formed in the base plate 12 provides for access by a push-pin servo writer during the disk drive assembly/manufacturing/formatting process at the factory. Most preferably, although not necessarily, the hard disk drive 10 employs embedded sector servo technology, explained by way of example in commonly assigned U.S. Pat. No. 5,255,136 to Machado et al., entitled: "High Capacity Submicro-Winchester Fixed Disk Drive", the disclosure thereof being incorporated herein by reference.

While in the preferred example of FIG. 1 the flat base plate 12 is preferably formed of sheet metal, those skilled in the art will appreciate that embodiments of the present invention may be provided for use with disk drives employing bases formed by casting, stamping, extrusion or any other suitable base fabrication method. While the cover is preferably formed as a deep-drawn sheet metal component, it too may be formed by any suitable method, such as casting, stamping, extrusion, etc.

The disk drive 10 also includes a rotary voice coil actuator assembly 24. The actuator assembly 24 includes an E-block rotor 26 including head arms or tines which support load beams 28. The load beams 28 act as springs as well as supports for head-gimbal assemblies including a magnetic transducer element (head transducers) 30, there being one head transducer 30 for each major surface of the storage disk 16 in the hard disk drive 10. The actuator assembly 24 also includes a bearing assembly 32 which includes e.g. two ball bearings and a wavy spring and spacer which act with an actuator shaft 56 to mount the actuator assembly 24 rotationally to the base plate 12. A trapezoidally shaped voice coil 34 is plastic-molded to the molded E-block assembly. A fixed permanent magnet assembly includes a lower permanent magnet 36 which is affixed to a lower magnetic flux return plate 38. An upper permanent magnet 40 may optionally be affixed similarly, e.g. by a suitable adhesive, to an upper magnet flux return plate 42 in order to provide increased magnetic flux in the gap between the two plates and magnets, thereby increasing responsiveness of the actuator to driving currents to reduce track access times. The lower plate 38 and the upper plate 42 are formed of a suitable ferromagnetic material. The lower plate 38 is secured to the base plate 12 by screws 39. Also, the upper plate 42 is held above the lower plate by three posts 58, 60 and 62. Posts 58 and 62 include elastomeric crash stops which effectively limit the angle of rotational displacement of the rotary actuator 24 to the active storage and landing zone areas of the data storage disk.

A flexible circuit 4d carries conductive traces to the heads 30 and to the rotary voice coil 34, including a ground trace for providing a signal ground for the metal parts of the actuator rotor 26. The flex circuit 44 also carries and connects a read preamplifier, write driver, head select integrated circuit 46 which is placed inside of the head and disk assembly in order to be close to the heads 30 in order to reduce pickup of extraneous noise. A flex circuit extension 47 provides for electrical circuit connections to a connector 48 mounted on a main printed circuit board 50. The circuit board 50 is positioned in a space between two angled side rails 52 which are attached to the flat base plate 12 by mounting screws 53. An insulating damper sheet 51 is interposed between the printed circuit board 50 and the sheet metal base plate 12, to reduce acoustic noise and to prevent exposed circuit traces of the printed circuit board to become shorted out to the base 12. A central cutout in the film sheet 51 is provided for the spindle motor assembly 14 and enables DC brushless spindle motor connecting pins to contact the circuit board 50 directly. Screws 49 enable the circuit board 50 to be mounted to threaded bosses extending from the angled side rails 52. The printed circuit board 50 carries all of the electronics circuitry of the disk drive 10, details of the circuitry not being described as not directly pertinent to the present invention. The foregoing description is provided by way of background to describe an intended structural and functional environment for embodiments of the present invention.

Figure 2:
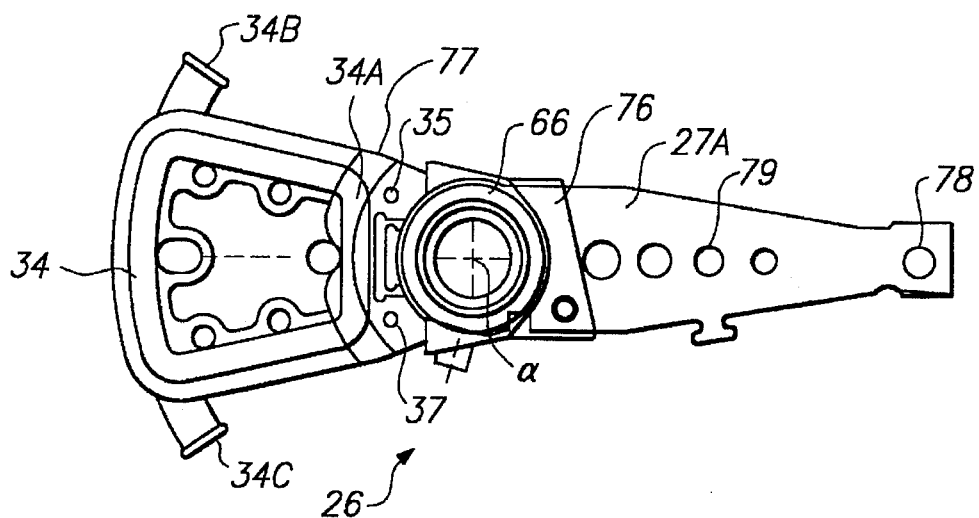
FIG. 2 is an enlarged plan view of a rotary voice coil actuator rotor incorporating principles of the present invention.

FIG. 2 provides a plan view of the actuator rotor 26 before insertion of the bearing assembly 32. The rotor 26 is formed to include a cylindrical metal hub alignment insert 66 which is aligned with an axis of rotation (alpha) of the rotary actuator. The insert 66 includes an outer cylindrical wall with a projecting annular spacer ring portion 68 which is formed integrally with the hub insert 66 as by turning on a precision lathe, and serves to space apart the two head arms 27A and 27B shown in FIG. 3. and illustrates a plastic hub overmold 76 which overmolds the metal hub insert 66 and adjacent portions of the head arms 27A and 27B, as well as a segment of the trapezoidal voice coil 34A.

Cylindrical openings of the head arms 27A and 27B are slightly undersized relative to the diameter of the outer wall of the insert 66, so that the arms 27A and 27B may be press fit over the outer wall and seated against the annular spacer ring portion 68 during fabrication. Each head arm 27 includes e.g. two registration holes 78 and 79, the hole 78 being defined at the outer end of the head arm 27 for attachment of the head gimbal assembly or assemblies 28 as by ball or pin swaging in conventional fashion. As part of the assembly of the head arms 27 onto the hub insert 66, the head arms 27 are maintained in alignment in a plane including the actuator axis of rotation alpha. Once the arms 27A and 27B are installed on the hub insert 66 and axial registration and co-planarity within parallel planes which are perpendicular to the axis of rotation alpha are verified, the assembly comprising the arms 27A and 27B and insert 66 is ready for the plastic molding process.

Figure 4:
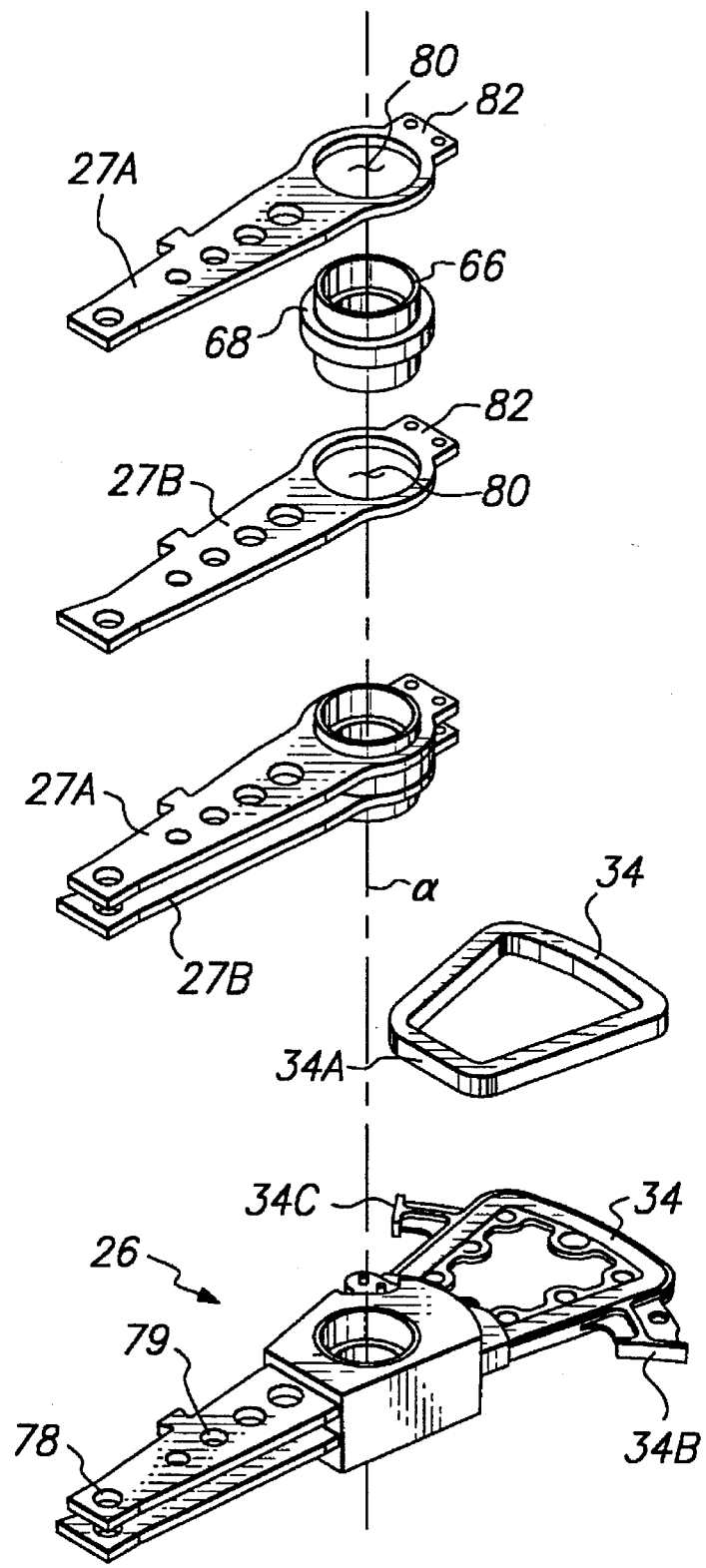
FIG. 4 is an exploded view of one preferred fabrication method for forming the FIG. 2 rotary voice coil actuator rotor.

As shown in FIG. 4, a plastic hub overmolding process may be carried out most preferably as a single step which includes complete envelopment by a suitable molding plastic resin of the exterior of the hub insert 66 and an inner leg 34A of the rotary voice coil 34, as well as encapsulation of the remaining portions of the coil 34 exteriorly of the encapsulated hub insert 66. In the example of FIG. 4, the molding resin is preferably a polyphenylene sulfide thermoplastic resin such as Ryton (tm) supplied by Phillips Petroleum Co. While the plastic injection molding process is conventional, advantageously, the hub insert 66 enables one or more features of the injection mold to engage the arm-hub insert subassembly and thereby result in a precision molding of the plastic hub overmold 76. When the voice coil 34 is molded into the actuator rotor 26, electrical contact pins 35 and 37 connected to ends of the voice coil, are also integrally molded into the hub assembly, facilitating mating contact with a portion of the flex circuit 44 carrying driving currents to the rotary actuator from servo driver circuitry (not separately shown) on the printed circuit board 50. A grounding lug is also provided for connecting a flex circuit ground trace to the metal arms 27 and hub insert 66.

Figure 3:
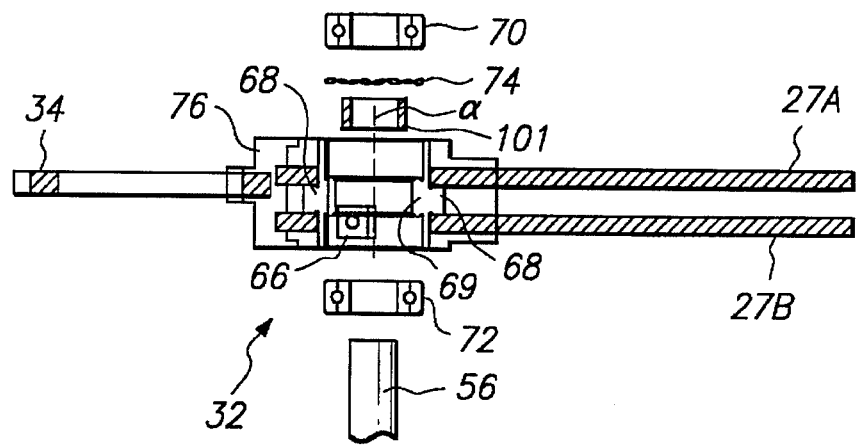
FIG. 3 is a side view in elevation and longitudinal section of the FIG. 2 voice coil actuator rotor.

Turning now to FIG. 3, the bearing assembly 32 is shown as including an upper ball bearing 70, and a lower ball beating 72 and a wavy washer 74 which is provided to preload one of the bearings 70, 72 during assembly thereof upon the actuator shaft 56. As formed, the hub insert 66 preferably also defines an inwardly projecting annular alignment ring 69 which forms an inner seat for the ball bearings 70 and 72. During assembly, the lower ball bearing assembly 72 is secured in the hub alignment insert 66 and held in place against a lower radial sidewall of the interior alignment ring 69 while an anaerobic adhesive, such as Loctite (tm) is permitted to cure. The inner races of the ball bearings 70 and 72 are sized and aligned to mate with the rotor shaft 56 which is secured to the hard drive base 12 (FIG. 1). After the lower bearing assembly 72 is secured in place and the shaft 56 installed, the wavy washer is seated against an upper radial sidewall of the alignment ring 69, and the upper bearing is positioned over the shaft 56. The inner races of bearings 70 and 72 and an inner race spacer 101 are then clamped together as a column, e.g. by means of a screw (not shown) The screw compresses the wavy washer 74, causing it to apply a suitable preload force to the upper bearing 70. The outer race of upper bearing 70 is then secured to the hub insert 66 with Loctite (tm). Since the bearing balls and races are typically made from electrically conductive materials and are forced into intimate contact by the bearing preload force leaving only an extremely thin film of bearing grease, a low Ohmic conduction path is present from the base 12 through the pin 56, bearings 70 and 72, and hub insert 66 to effectively ground each of the arms 27 thereby providing a low Ohmic contact between the arms 27 and ground. However, a separate ground supplied from the base 12 via the flexible circuit 44 is preferred to provide a signal ground for the head arms 27A and 27B.

FIG. 4 illustrates steps for forming the rotary voice coil actuator rotor 26. The head arms 27A and 27B are aligned and then press-fit onto the hub alignment insert 66 until each arm is resting against a sidewall of the flange portion 68. As formed, each head arm 27 includes a central opening 80 which may be slightly undersized, e.g. by one to several ten-thousandths of an inch relative to an outer diameter of the hub insert 66, in order that a secure interference fit is established between each arm 27 and the insert 66. Alternatively, and equally preferably, the central opening 80 of each head arm may be sized to slip-fit over the hub insert 66 to facilitate rapid assembly of components prior to the plastic overmolding step.

Also, each arm includes an end portion 82 defining e.g. a pair of openings which facilitate positive lock of the arm to the hub insert by plastic molding. Also, as shown in FIG. 4, the coil 34 may be encapsulated to have integral crash stop extensions 34B and 34C for contacting the elastomeric crash stops secured by the posts 58 and 62, by which rotary displacement of the actuator 26 is limited to the multiple concentric track locations defined on the storage disk 16, including an innermost landing zone region thereof.

Figure 5:
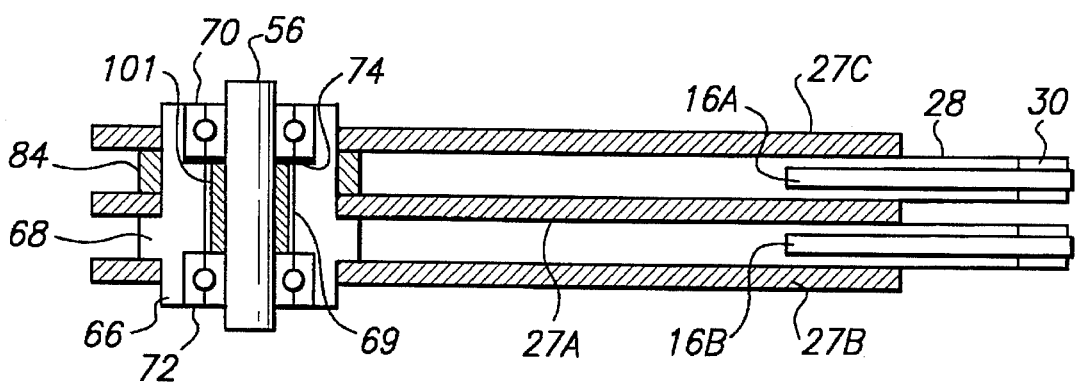
FIG. 5 is an exploded side view in elevation and section of an alternative form of rotary voice coil actuator rotor for use with multiple data storage disks and their storage surfaces.

FIG. 5 illustrates an embodiment of the present invention which is suited for use with multiple data storage disks. In this example, two data storage disks 16A and 16B are served by four head-gimbal assemblies 28, there being an upfacing and a downfacing assembly 28 swaged to the head arm 27A, an up facing assembly 28 swaged to the head arm 27B and a down-facing assembly 28 swaged to a third sheet metal head arm 27C. In this embodiment, the hub insert 66 is elongated along the axis alpha, and a discrete spacer ring 84 is provided to separate the head arm 27A and the head arm 27C. The FIG. 6 assembly view illustrates the rotor assembly immediately before the steps of positioning of the rotary voice coil and overmolding the assembly with plastic overmolding material. Otherwise, the elements of the FIG. 6 embodiment are the same as shown and discussed previously herein.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A rotary voice coil actuator for a hard disk drive comprising:

a generally trapezoidal voice coil of wire and two connector pins attached to ends thereof, a metal hub alignment insert defining a central opening for receiving a bearing assembly, the insert having an outer wall and an integral annular spacer ring portion extending radially outwardly from the outer wall, the spacer ring portion having two radial walls which extend radially outward from the outer wall of the metal hub alignment insert, and the spacer ring portion having a predetermined axial length between the radial walls for spacing apart two head arms, at least two elongated stamped sheet metal head arms, each arm including an outer end and an inner end defining an opening for registering with the outer wall of the metal hub alignment insert, a region of each one of a first two of the head arms adjacent to the opening being aligned by contacting a radial wall of the annular spacer ring portion, the first two head arms being axially aligned and separated by the annular spacer ring portion, an overmolded plastic hub encapsulating at least one portion of the generally trapezoidal voice coil of wire positioned adjacent to the metal hub alignment insert and partially encapsulating the connector pins, and encapsulating the outer wall of the metal hub alignment insert and regions of each head arm adjacent to the opening, the bearing assembly within the metal hub alignment insert including inner bearing races for contacting a post fixed to a base for supporting the rotary voice coil actuator, at least one head-gimbal assembly attached to each outer end of the elongated head arms, and a permanent magnet stator structure affixed to the base adjacent to the voice coil.

2. The rotary voice coil actuator set forth in claim 1 wherein the at least two elongated head arms are attached by an interference fit to the outer wall of the metal hub alignment insert.

3. The rotary voice coil actuator set forth in claim 1 wherein the at least two elongated head arms are attached by a slip fit to the outer wall of the metal hub alignment insert.

4. The rotary voice coil actuator set forth in claim 1 comprising three elongated stamped sheet metal head arms, evenly spaced apart the first two elongated stamped sheet metal head arms being separated by the annular spacer ring portion, and further comprising a spacer ring on the metal hub alignment insert for separating one of the first two elongated stamped sheet metal head arms and a third elongated stamped sheet metal head arm, the third elongated stamped sheet metal head arm including an outer end and an inner end defining an opening sized to fit closely over and be aligned by the outer wall of the metal hub alignment insert and separated from the one of the first two elongated stamped sheet metal head arms by the spacer ring, the overmolded plastic hub encapsulating the spacer ring and a region of the thud elongated stamped sheet metal head arm adjacent to the metal hub alignment insert.

5. The rotary voice coil actuator set forth in claim 4 wherein the bearing assembly provides a low Ohmic conduction path between the post and the at least two elongated head arms thereby effectively grounding the head arms to the base.

6. A rotor of a rotary voice coil actuator assembly of a hard disk drive, the rotor comprising:

a flat, generally trapezoidal voice coil of wire and electrical connector pins attached to respective ends of the coil, a cylindrical metal hub alignment insert having a central opening and an outer cylindrical wall, a first annular spacer ring extending radially outwardly from the outer cylindrical wall of the cylindrical metal hub alignment insert and having first and second radial walls extending radially outward from the outer cylindrical wall of the cylindrical metal hub alignment insert, the first and second radial walls separated by a predetermined axial length, a first elongated stamped sheet metal head arm including an outer end and an inner end defining an opening sized to fit closely over the outer cylindrical wall of the cylindrical metal hub alignment insert and against the first radial wall of the spacer ring thereby being precisely aligned axially relative to the cylindrical metal hub alignment insert, a bearing assembly having outer bearing races secured to the cylindrical metal hub alignment insert in the central opening, and an overmolded plastic hub encapsulating at least a portion of the generally trapezoidal coil of wire adjacent to the cylindrical metal hub alignment insert and partially encapsulating the first annular spacer ring and the cylindrical outer wall of the cylindrical metal hub alignment insert, and encapsulating the inner end of the first head arm.

7. The rotor set forth in claim 6 wherein the bearing assembly includes inner races, and further comprising a post to which the inner races are secured.

8. The rotor set forth in claim 7 wherein the bearing assembly provides a low Ohmic conduction path between the post and the first elongated head arm thereby effectively grounding the first head arm to the post.

9. The rotor set forth in claim 6 wherein the first annular spacer ring is an integral portion of the cylindrical metal hub alignment insert.

10. The rotor set forth in claim 6 further comprising a second elongated stamped sheet metal head arm including an outer end and an inner end defining an opening sized to fit closely over the outer wall of the metal hub alignment insert and against the second radial wall of the first spacer ring, the overmolded plastic hub encapsulating the inner end of the second head arm adjacent to the second radial wall, the second elongated head arm being radially aligned on the metal hub alignment insert with the first radial head arm.

11. The rotor set forth in claim 10 further comprising a second annular spacer ring extending radially outwardly from the outer wall of the cylindrical metal hub alignment insert and having a third radial wall in contact with the inner end of one of the first and second head arms and a fourth radial wall separated from the third radial wall by a predetermined axial length, and a third elongated stamped sheet metal head arm including an outer end and an inner end defining an opening sized to fit closely over the outer wall of the metal hub alignment insert and against the fourth radial wall of the second spacer ring, the overmolded plastic hub encapsulating the second annular spacer ring and the inner end of the third head arm adjacent to the fourth radial wall, the third head arm being radially aligned on the metal hub alignment insert with the first and second radial head arms.

12. A rotary voice coil actuator assembly in a hard disk drive having at least one rotating data storage disk secured to a base, the actuator assembly comprising:
- a generally trapezoidal voice coil of wire and two connector pins attached to ends thereof,
- a metal hub alignment insert defining a central opening for receiving a bearing assembly having an outer wall and an integral annular spacer ring portion extending radially outwardly from the outer wall, the spacer ring portion having two radial walls which extend radially outward from the outer wall of the metal hub alignment insert, and the spacer ring portion having a predetermined axial length between the radial walls for spacing apart two head arms,
- at least two stamped sheet metal elongated head arms, each arm including an outer end and an inner end defining an opening for registering with the outer wall of the metal hub alignment insert, a region of each one of a first two of the head arms adjacent to the opening being aligned by contacting a radial wall of the annular spacer ring portion, the first two head arms being axially aligned and separated by the annular spacer ring portion,
- an overmolded plastic hub encapsulating at least one portion of the generally trapezoidal voice coil of wire positioned adjacent to the metal hub alignment insert and partially encapsulating the connector pins, and encapsulating the outer wall of the metal hub alignment insert and regions of each head arm adjacent to the opening,
- the bearing assembly within the metal hub alignment insert including inner bearing races for contacting a post fixed to the base for supporting the rotary voice coil actuator,
- at least one head-gimbal assembly attached to each outer end of the elongated head arms, and
- a permanent magnet stator structure affixed to the base adjacent to the voice coil.

* * * * *